(12) United States Patent
Shindo et al.

(10) Patent No.: US 12,663,917 B2
(45) Date of Patent: Jun. 23, 2026

(54) COMIC REPRODUCTION SYSTEM WITH SCROLL DIRECTION-BASED SOUND REPRODUCTION CONTROL

(71) Applicant: YOSHIMOTO CVC, INC., Tokyo (JP)

(72) Inventors: Kosuke Shindo, Tokyo (JP); Hideyuki Takei, Tokyo (JP)

(73) Assignee: YOSHIMOTO CVC, INC., Tokyo (JP)

( * ) Notice: Subject to any disclaimer, the term of this patent is extended or adjusted under 35 U.S.C. 154(b) by 171 days.

(21) Appl. No.: 18/245,998

(22) PCT Filed: Nov. 2, 2020

(86) PCT No.: PCT/JP2020/041079
§ 371 (c)(1),
(2) Date: Mar. 20, 2023

(87) PCT Pub. No.: WO2022/064722
PCT Pub. Date: Mar. 31, 2022

(65) Prior Publication Data
US 2023/0350560 A1 Nov. 2, 2023

(30) Foreign Application Priority Data

Sep. 24, 2020 (JP) ................................ 2020-160172

(51) Int. Cl.
*G06F 3/0485* (2022.01)
*G06F 3/04847* (2022.01)
(Continued)

(52) U.S. Cl.
CPC ........ *G06F 3/0485* (2013.01); *G06F 3/04847* (2013.01); *G06F 3/165* (2013.01);
(Continued)

(58) Field of Classification Search
CPC .... G06F 3/0485; G06F 3/04847; G06F 3/165; G06F 40/47; G06F 3/0488; G06F 40/58;
(Continued)

(56) References Cited

U.S. PATENT DOCUMENTS 7,110,945 B2 * 9/2006 Cogliano ............... G09B 19/06
704/235
8,671,359 B2 * 3/2014 Koizumi ............ H04N 21/4312
715/721
(Continued)

FOREIGN PATENT DOCUMENTS

CN 103339622 A 10/2023
JP 200726355 A 2/2007
(Continued)

*Primary Examiner* — Kenny Nguyen
(74) *Attorney, Agent, or Firm* — Taro Yaguchi

(57) ABSTRACT

There is provided a system or the like capable of providing more entertaining vertical scroll comics utilizing mobile terminal functionality. There is provided a comic reproduction system, using comic data including: comic data including backgrounds, characters, and speech balloons, which are prepared for a story to progress in a predetermined scroll direction; sound data including lines, mimetic words, onomatopoeia, phonomimes, phenomimes, a title, sound effects, and music, which correspond to the comic data; and sound data reproduction position data for storing a reproduction start position of the sound data as a position along the scroll direction of the comic data, the comic reproduction system comprising: a comic image data display means for a computer to display a predetermined part of the comic data on a display screen of a device, and also continuously move the displayed part of the comic data on the display screen with a scroll operation by a user; and a sound data reproduction means for the computer to determine whether a reproduction start position of the sound data reached a predetermined reproduction criterial position within the display screen
(Continued)

Current scroll position S1

Screen upper end
(30% from screen upper end) S2
Sound production criterial position in forward scrolling
(70% from screen upper end) S3
Sound production criterial position in backward scrolling 10 (12)

Line 1

Sound Effect 1

Sound line
Line 2

M0 Upper End of Comic Data
Sound production start position in forward scrolling and sound production
M3 stop position in backward scrolling for Sound Effect 1 (simultaneous sound production-enabled)
M1 Sound production start position in forward scrolling for Line 1 (simultaneous sound production-disabled)
M2 Sound production start position in backward scrolling for Line 1
M4 Sound production start position in backward scrolling and sound production stop position in forward scrolling for Sound Effect 1 (simultaneous sound production-enabled)
M5 Sound production start position in forward scrolling for Line 2 (simultaneous sound production-disabled)
M6 Sound production start position in backward scrolling for Line 2 during the movement of the displayed part of the comic data by the scroll control means, and reproduce the sound data.

13 Claims, 8 Drawing Sheets

(51) Int. Cl.
    *G06F 3/0488*        (2022.01)
    *G06F 3/16*          (2006.01)
    *G06F 40/47*       (2020.01)
    *G10L 13/02*       (2013.01)

(52) U.S. Cl.
    CPC .............. *G06F 40/47* (2020.01); *G10L 13/02* (2013.01); *G06F 3/0488* (2013.01)

(58) Field of Classification Search
    CPC .. G06F 3/04845; G06F 3/04855; G06F 3/147; G06F 3/167; G06F 16/4393; G06F 3/0481; G06F 13/00; G10L 13/02; G10L 13/00; G09G 5/22; G09G 5/34; H04L 67/02
    See application file for complete search history.

(56) References Cited

U.S. PATENT DOCUMENTS

| | | | | |
|---|---|---|---|---|
| 8,719,029 | B2 * | 5/2014 | Nonaka ................... | G06F 40/58 |
| | | | | 704/260 |
| 9,378,474 | B1 * | 6/2016 | Story, Jr. ................ | G06Q 10/06 |
| 9,684,641 | B1 * | 6/2017 | Hamaker .............. | G06F 40/197 |
| 10,175,941 | B2 * | 1/2019 | Molesky ............... | G06F 3/0485 |
| 10,261,749 | B1 * | 4/2019 | Wilcox ............... | G06F 3/04845 |
| 10,423,385 | B2 * | 9/2019 | Molesky ................. | G06F 3/167 |
| 2010/0318364 | A1 * | 12/2010 | Kurzweil ............... | G10L 13/00 |
| | | | | 704/260 |
| 2012/0066592 | A1 * | 3/2012 | Issa ........................ | G06F 3/0485 |
| | | | | 715/716 |
| 2012/0196260 | A1 * | 8/2012 | Nhiayi ..................... | G09B 5/06 |
| | | | | 434/317 |
| 2013/0282376 | A1 * | 10/2013 | Nonaka ................. | G06F 40/123 |
| | | | | 704/260 |
| 2013/0283157 | A1 * | 10/2013 | Ebata ...................... | G06F 40/53 |
| | | | | 715/265 |
| 2013/0326341 | A1 * | 12/2013 | Nonaka ................... | G06T 11/60 |
| | | | | 715/246 |
| 2014/0057243 | A1 * | 2/2014 | Yamaguchi ............. | G09B 5/12 |
| | | | | 434/362 |
| 2016/0125632 | A1 | 5/2016 | Yu et al. | |
| 2017/0083196 | A1 * | 3/2017 | Hartrell ................. | G06N 3/084 |
| 2017/0083511 | A1 * | 3/2017 | Hartrell ................. | G06N 3/084 |
| 2017/0285857 | A1 * | 10/2017 | Kuan .................... | G06F 3/0446 |
| 2017/0344339 | A1 * | 11/2017 | Molesky ................ | G06F 3/167 |
| 2017/0365083 | A1 * | 12/2017 | Hartrell ................. | G06F 18/214 |
| 2019/0095172 | A1 * | 3/2019 | Molesky ................ | G06F 3/167 |
| 2019/0196675 | A1 * | 6/2019 | German ................. | G06V 30/40 |
| 2019/0198039 | A1 * | 6/2019 | Breedvelt-Schouten .................... G06F 40/117 |
| 2022/0360855 | A1 * | 11/2022 | Palmer .............. | H04N 21/4394 |

FOREIGN PATENT DOCUMENTS

| | | |
|---|---|---|
| JP | 2012-133660 A | 7/2012 |
| JP | 201691536 A | 5/2016 |
| JP | 7011755 B1 | 1/2022 |

* cited by examiner

20

| Sound Data ID | 1 | 2 | 3 |
|---|---|---|---|
| Sound Data File Name | Sound effect 1 | Line 1 | Line 2 |
| Simultaneous reproduction-disabled flag | off | on | on |
| Loop reproduction-disabled flag | on | off | off |
| Reproduction start position in forward scrolling | M3 | M1 | M5 |
| Reproduction stop position in forward scrolling | M4 | - | - |
| Reproduction start position in backward scrolling | M4 | M2 | M6 |
| Reproduction stop position in backward scrolling | M3 | - | - |
| Sound data text | Bang! | Hello | Good bye |

Downloaded Comics

☐ Comic 1
☐ Comic 2
☐ Comic 3
☐ Comic 4
▼ See more

Recommended Comics

☐ Comic 5
☐ Comic 6
☐ Comic 7
☐ Comic 8
▼ See more

10

Setting

Criterial Position in
Forward Scroll Direction
                    30% ▲▼

Criterial Position in
Backward Scroll Direction
                    30% ▲▼

Scroll Velocity Threshold
            Slow      ▲▼
            Medium
            Fast Language    Japanese ▲▼
Setting
    ◉ Use automatic translation Save

COMIC REPRODUCTION SYSTEM WITH SCROLL DIRECTION-BASED SOUND REPRODUCTION CONTROL

FIELD OF THE INVENTION

The present invention relates to a comic reproduction system, a method therefor, a computer software program therefore, and comic data used therefor for viewing comics on a mobile terminal.

BACKGROUND OF THE INVENTION

Conventionally, comics have been commonly provided as books in the two-page spread format. In recent years, however, as smartphones have become widely used, so-called "vertical scroll comics," which are not expected to be provided as books, have been devised and gradually gaining popularity.

In the vertical scroll comic format, users read them on their smartphone and/or tablet screens by scrolling the comics with a finger or the like, wherein there is no concept of flipping pages as in books, and therefore, the vertical scroll comics are provided as a single-page image, which would otherwise span over multiple pages in comic books.

SUMMARY OF THE INVENTION

Problem to be Solved by the Invention

Incidentally, current vertical scroll comics are made to simply scroll an image without taking full advantage of features of smartphones and/or tablets.

Considering the above situation, the purpose of the present invention is to provide a system or the like capable of providing more entertaining vertical scroll comics utilizing mobile terminal functionality.

Means for Solving the Problem

In order to overcome the above challenges, according to a first principal aspect of the present invention, a following configuration is provided.

(1) A comic reproduction system, using
comic data including:
    comic data including backgrounds, characters, and speech balloons, which are prepared for a story to progress in a predetermined scroll direction;
    sound data including lines, mimetic words, onomatopoeia, phonomimes, phenomimes, a title, sound effects, and music, which correspond to the comic data; and
    sound data reproduction position data for storing a reproduction start position of the sound data as a position along the scroll direction of the comic data,
the comic reproduction system comprising:
a comic image data display means for a computer to display a predetermined part of the comic data on a display screen of a device, and also continuously move the displayed part of the comic data on the display screen with a scroll operation by a user; and
a sound data reproduction means for the computer to determine whether a reproduction start position of the sound data reached a predetermined reproduction criterial position within the display screen during the movement of the displayed part of the comic data by the scroll control means, and reproduce the sound data.

(2) The comic reproduction system of (1), further comprising
a scroll direction detecting means for the computer to detect whether the scroll direction is a forward scroll direction or a backward scroll direction regarding the scroll operation of the user,
wherein the reproduction position data stores, for each sound data, reproduction start positions in forward scrolling and backward scrolling.

(3) The comic reproduction system of (2), wherein
different values may be configured for the reproduction start position in forward scroll direction and the reproduction start position in backward scroll direction, respectively.

(4) The comic reproduction system of (1), wherein
the sound data reproduction position data may configure, for specific sound data, a reproduction stop position in addition to the reproduction start position.

(5) The comic reproduction system of (1), wherein
the reproduction position data stores, for each sound data, whether the sound data is simultaneous reproduction-enabled or simultaneous reproduction-disabled, and
when the sound data reproduction means detects that a reproduction start position of specific sound data reached a predetermined reproduction criterial position, the sound data reproduction means stops reproduction of other sound data being reproduced and reproduces the specific sound data if the specific sound data is simultaneous reproduction-disabled and other sound data being reproduced is simultaneous reproduction-disabled.

(6) The comic reproduction system of (1), wherein
the sound data reproduction means stops reproduction of sound data if a scroll velocity by the user's scroll operation reaches a value equal to or greater than a threshold.

(7) The comic reproduction system of (6), further comprising
a control interface display means for the computer to provide a configuration interface for configuring the threshold of the scroll velocity.

(8) The comic reproduction system of (1), wherein
the sound data further includes text data of the sound data,
the comic reproduction system, further comprising
a language processing means for the computer to perform display on the display screen of the device according to the user's language.

(9) The comic reproduction system of (1), wherein
the sound data further includes text data of the sound data,
the comic reproduction system, further comprising
a language processing means for the computer to perform display on the display screen of the device according to the user's language.

(10) The comic reproduction system of (1), wherein
a language processing means for the computer to execute automatic translation based on the sound data and display the automatically translated text on the screen.

(11) The comic reproduction system of (10), wherein
the language processing means further generates sound data based on the automatically translated text.

(12) The comic reproduction system of (1), wherein
further, a reproduction start position of sound data corresponding to a speech balloon displayed in a comic is automatically generated according to a position of the speech balloon.

Also, according to a second principal aspect of the present invention, there is provided an invention of a method as below implemented in the above system.

(13) A comic reproduction method utilizing a computer, using comic data including:

comic data including backgrounds, characters, and speech balloons, which are prepared for a story to progress in a predetermined scroll direction;

sound data including lines, mimetic words, onomatopoeia, phonomimes, phenomimes, a title, sound effects, and music, which correspond to the comic data; and sound data reproduction position data for storing a reproduction start position of the sound data as a position along the scroll direction of the comic data, the comic reproduction method comprising the steps of:

displaying comic image data by the computer, by displaying a predetermined part of the comic data on a display screen of a device, and also continuously moving the displayed part of the comic data on the display screen with a scroll operation by a user; and reproducing sound data by the computer, by determining whether a reproduction start position of the sound data reached a predetermined reproduction criterial position within the display screen during the movement of the displayed part of the comic data by the step of controlling scroll, and reproducing the sound data.

Further, according to a third principal aspect of the present invention, there is provided a computer software program implemented in the above system, and the computer software program comprises the following configuration.

(25) A computer software program installed in a storage medium of a computer, for reproducing comic data, the computer software program using comic data including:

comic data including backgrounds, characters, and speech balloons, which are prepared for a story to progress in a predetermined scroll direction;

sound data including lines, mimetic words, onomatopoeia, phonomimes, phenomimes, a title, sound effects, and music, which correspond to the comic data; and sound data reproduction position data for storing a reproduction start position of the sound data as a position along the scroll direction of the comic data, for executing the steps of:

displaying comic image data by the computer, by displaying a predetermined part of the comic data on a display screen of a device, and also continuously moving the displayed part of the comic data on the display screen with a scroll operation by a user; and reproducing sound data by the computer, by determining whether a reproduction start position of the sound data reached a predetermined reproduction criterial position within the display screen during the movement of the displayed part of the comic data by the step of controlling scroll, and reproducing the sound data.

Furthermore, according to a fourth principal aspect of the present invention, there is provided comic data used in the above system, method, and computer software program, and the comic data comprises the following configuration.

(37) Comic data used in the invention of (1), (13), and (25), comprising:

comic data including backgrounds, characters, and speech balloons, which are prepared for a story to progress in a predetermined scroll direction;

sound data including lines, mimetic words, onomatopoeia, phonomimes, phenomimes, a title, sound effects, and music, which correspond to the comic data; and sound data reproduction position data for storing a reproduction start position of the sound data as a position along the scroll direction of the comic data.

The above and other configurations, operations, and effects of the present invention are described in the following Detailed Description of the Invention and the accompanying drawings such that those configurations, operations, and effects will be readily appreciated by those skilled in the art.

BRIEF DESCRIPTION OF THE DRAWINGS

FIG. 4 is a schematic structural view showing sound data reproduction position data according to the one embodiment of the present invention;

DETAILED DESCRIPTION OF THE INVENTION

One embodiment of the present invention will be described below in detail with reference to accompanying drawings.

Over All Configuration

Figure 1:
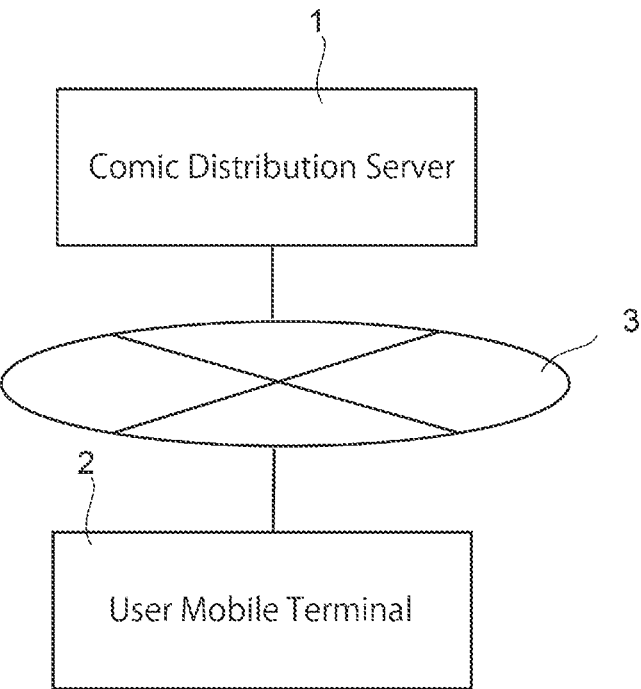
FIG. 1 is a schematic view showing an overall configuration of a system according to one embodiment of the present invention.

Indicated with the reference number 1 in FIG. 1 is a comic distribution server for hosting a comic distribution service, and indicated with 2 is a mobile terminal of a user receiving the comic distribution service (hereinafter, simply referred to as a "user terminal"), wherein this user terminal 2 is connected to the comic distribution server 1 via the Internet 3.

In the comic distribution server 1, there is stored much comic data, and the user may connect the user's mobile terminal 2 to the comic distribution server 1 and download comic data of choice for reproduction.

Note that this embodiment is adapted to perform the connection from the user terminal 2 using a dedicated app.

Here, a method for transferring the comic data to the user terminal 2 may be through HTML, FTP, or any of the other communication formats.

Also, the comic distribution server 1 is provided with various functions required to distribute the above comic data to the user terminal 2. Such functions include: a function for searching comic data stored in the server 1 in response to a request from the user terminal 2, and returning the result to the user terminal 2; a clearing function for selling the comic data; and the like, but since these search and/or clearing functions may utilize services which are already well known, descriptions for those functions will be omitted here.

User Terminal

Figure 2:
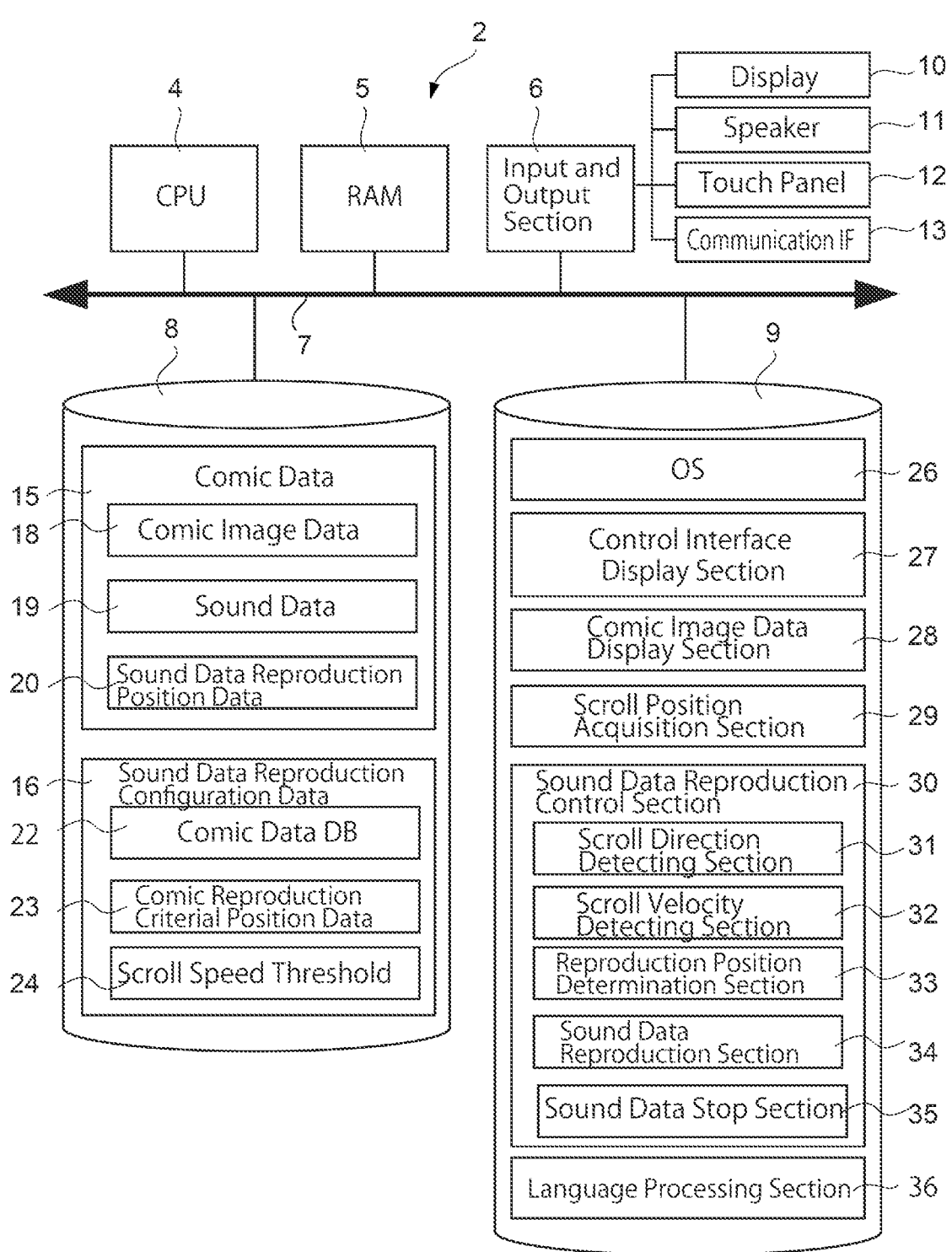
FIG. 2 is a schematic structural view showing a user terminal according to the one embodiment of the present invention.

FIG. 2 is a schematic view showing a system configuration of the user terminal 2.

This user terminal 2, in this embodiment, is a smartphone, which comprises a bus 7 connected with a CPU 4, a RAM 5, and an input/output section 6; and a data storage section 8 and a program storage section 9, which are connected with the bus 7.

Input/Output Section

Here, the input/output section 6 includes a display 10 and a speaker 11 (including external output such as earphones and the like) as interfaces for output; a touch panel 12 as an interface for input; and a communication interface 13 such as Bluetooth, Wi-Fi, and the like. In this embodiment, the above touch panel 12 is provided with a transparent screen, and disposed over the display 10 to thereby constitute a touch screen.

Figure 3:
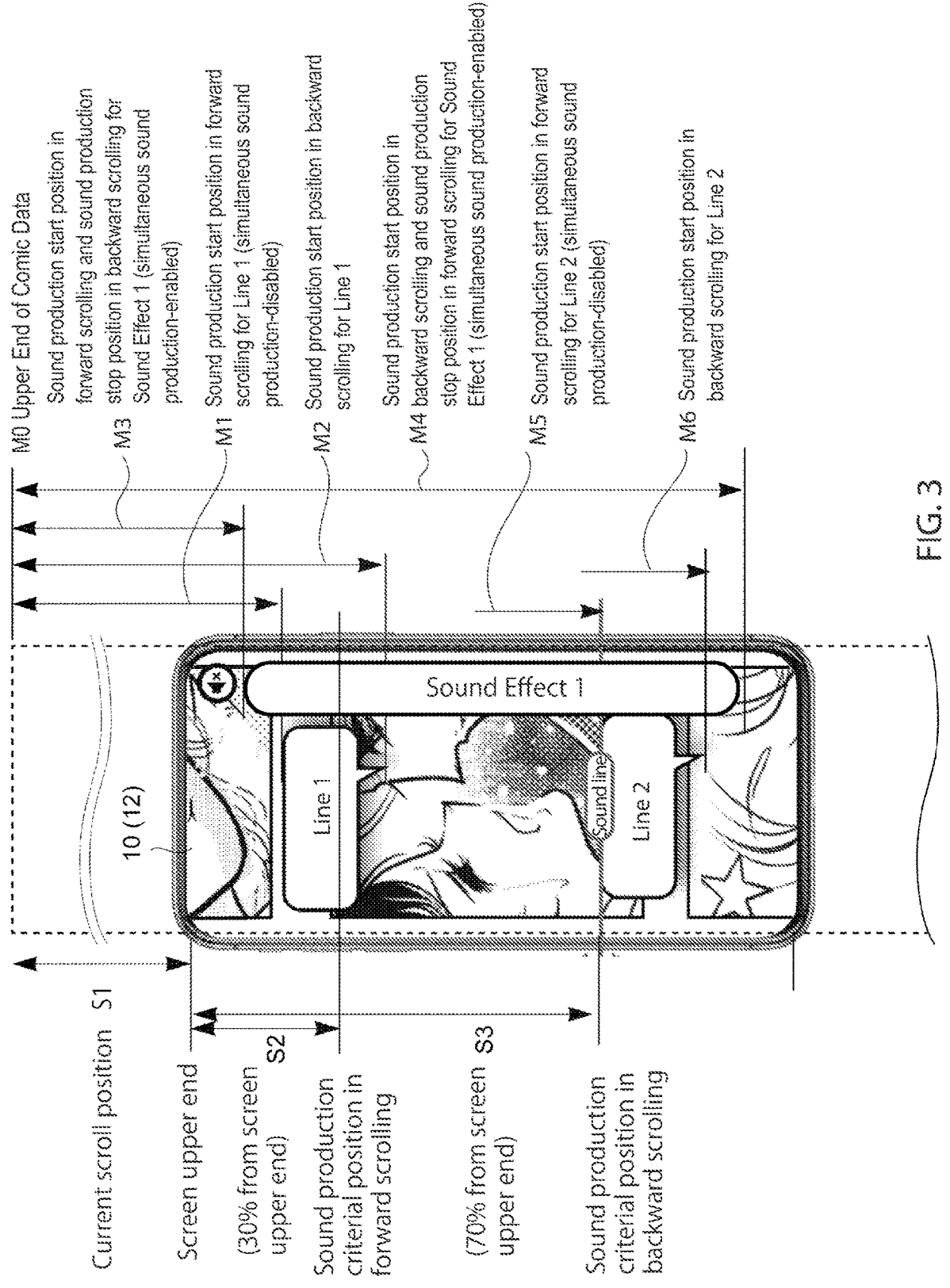
FIG. 3 is a conceptual diagram showing operations according to the one embodiment of the present invention.

In other words, the user terminal 2 of this embodiment, as shown in FIG. 3, displays the comic data with a large display 10 in a portrait orientation, also activates the touch panel 12 in response to the user touching and dragging up and down on the display 10, and generates a command to scroll the comic data downwards. Also, this embodiment is adapted to replay sound data corresponding to lines and the like in the comic via an built-in speaker 11 of this user terminal 2.

Data Storage Section

The data storage section 8 (FIG. 2) stores comic data 15 and configuration data 16.

Comic Data

The comic data 15, downloaded from the server 1, consists of comic image data 18 constituting the comic itself, sound data 19, and sound data reproduction position data 20.

Comic Image Data

The comic image data 18 is, as shown in FIG. 3, vertically long image data elongated in a scrolling direction. Main components of this comic image data 18 are backgrounds, characters, and speech balloons. The speech balloons displays lines of characters, wind sounds, other sounds, and the like.

Note that, here, comics broadly encompass not only so-called comics, but also backgrounds, characters, and speech balloons.

Sound Data

The sound data items 19 are lines displayed in the speech balloons, sound effects and the like as well as background sounds, theme songs, and the like, which are not displayed in the comic image data, and a sound data item 19 is stored in the data storage section 8 with a predetermined file name together with an extension indicating its file format.

Note that this sound data 19 may be prepared according to different languages.

Also, the sound data include lines, mimetic words, onomatopoeia, phonomimes, phenomimes, a title, sound effects, and music corresponding to the comic data, but the sound data may include only one or all of these.

Sound Data Reproduction Position Data

The sound data reproduction position data 20 defines a position where the sound data 19 is reproduced in the comic image data 18.

The sound data reproduction position data 20 as shown in FIG. 4, includes an ID of each sound data, a file name of each sound data 19, a simultaneous reproduction-disabled flag, a loop reproduction-disabled flag, a reproduction start position in forward scrolling, a reproduction stop position in forward scrolling, a reproduction start position in backward scrolling, a sound production stop position in backward scrolling, and a sound data-associated text.

This reproduction position data 20 will be discussed below with reference to FIG. 3 as an example.

Simultaneous Reproduction-Disabled Flag

Firstly, the sound data includes data disabled and data enabled for simultaneous reproduction, and they are distinguished by whether or not there is the sound reproduction-disabled flag (on, off). In this example, a line 1 is simultaneous reproduction-disabled data, and in this case, line 1 is not allowed to be replayed at the same time as other simultaneous reproduction-disabled data (e.g., line 2), wherein the simultaneous reproduction-disabled data is configured such that the reproduction of the current data is forced to stop if reproduction of next data starts.

On the other hand, in this example, a sound effect 1 is simultaneous reproduction-enabled data. For simultaneous reproduction-enabled data, it may be replayed even when other simultaneous reproduction-disabled sound data and/or simultaneous reproduction-enabled sound data are being replayed.

Loop Reproduction-Disabled Flag

Also, if the loop reproduction-disabled flag is off, the corresponding sound data will be replayed in loop unless stopped. In this example, the loop reproduction-disabled flag of the sound effect 1 is off, and the loop reproduction-disabled flags of the line 1 and the line 2 are on.

Reproduction Start Position and Reproduction Stop Position

Also, each sound date 19 is configured with a reproduction start position in forward scrolling, a reproduction stop position in forward scrolling, a reproduction start position in backward scrolling, and a reproduction stop position in backward scrolling.

The reproduction start position in forward scrolling refers to a reproduction start position when the comic image data 18 is scrolled in a forward direction, whereas the reproduction start position in forward scrolling refers to a reproduction stop position when the comic image data is scrolled in a forward direction.

The reproduction start position in backward scrolling refers to a reproduction start position when the comic image data 18 is scrolled in a backward direction, whereas the reproduction start position in backward scrolling refers to a reproduction start position when the comic image data is scrolled in a backward direction.

Taking the line 1 as an example, as shown in FIG. 3, the reproduction start position in forward scrolling is set to a pixel coordinate value M1 with a comic data upper end M0 as a point of origin; whereas the reproduction start position in backward scrolling is set to a pixel coordinate value M2 with a comic data upper end M0 as a point of origin. Note that, in the case of this line 1, there is no reproduction stop position configured (see FIG. 4).

Also, in the case of the simultaneous reproduction-enabled sound effect 1, the reproduction start position in forward scrolling and the reproduction stop position in backward scrolling are set to a pixel coordinate value M3 with a comic image data upper end M0 as a point of origin; whereas the reproduction stop position in forward scrolling and the reproduction start position in backward scrolling are set to a pixel coordinate value M4 with a comic data upper end M0 as a point of origin. For this sound effect 1, the reproduction stop position is configured so that the reproduction stops at a predetermined position, but since the loop reproduction-disabled flag is off, the reproduction continues unless a stop command is received.

Such a setting as each of the above flags, reproduction start positions, and reproduction stop positions are to be configured freely by a comic creator according to a worldview that the creator desires to express, wherein these settings are adapted to enable expressions in various patterns by combining those settings as needed.

Sound Reproduction Configuration Data

Next, sound data reproduction configuration data 16 will be described (FIG. 2).

This configuration data 16 stores therein a comic data DB (database) 22, screen reproduction criterial position data 23, and a scroll speed threshold 24.

Comic Data DB

The comic data DB 22 is a database for managing comic data 15 downloaded to this user terminal 2. Note that this comic data DB 22 may store information and the like and/or other information on not only the downloaded comic data, but also not-yet-downloaded, but favorite comic data.

Comic Reproduction Criterial Position Data

The screen reproduction criterial position data 23 defines a position on the display 10 for starting or stopping the reproduction of the sound data 19. In this embodiment, as shown in FIG. 3, sound production criterial position in forward scrolling S2 is set to a position at 30% (of a display longitudinal dimension) from the display upper end, and sound production criterial position in backward scrolling S3 is set to a position at 70% from the display upper end. These are default values and, as described below, may be changed according to the user preferences.

Note that the configuration of the reproduction criterial positions are not limited to this method, but may be configured with, for example, specifically a pixel value, and may also be configured with, for example, elapsed time (e.g., several seconds elapsed at a predetermined velocity).

Scroll Speed Threshold

Also, the scroll speed threshold 24 is a value for stopping the sound data reproduction above a certain scroll speed. For instance, it may be defined with a number of pixels per second (Px/s), or a fraction such as percentage.

This scroll speed threshold, as described below, may be changed also according to the user preferences.

Sound Data Text

The sound data text describes the sound reproduced as sound data. This text is preferably stored together with an identifier indicating a language according to the language of the sound data.

Program Storage Section

Next, the program storage section 9 (FIG. 2) stores therein—to list only configurations related to the spirit and scope of the present invention—an operating system (OS) 26 for performing a basic operational control of the CPU 4, the RAM 5, and the input/output section 6 (10-13); as well as a control interface display section 27; a comic image data display section 28; a scroll position acquisition section 29; a sound data reproduction control section 30; and a language processing section 36.

The sound data reproduction control section 30 comprises a scroll direction detecting section 31, a scroll velocity detecting section 32, a reproduction position determination section 33, a sound data reproduction section 34, and a sound data stop section 35.

Operations

Configuration of the respective component sections 26-36 will be discussed in detail below in reference with operations of the present system.

App Installation

Firstly, in this embodiment, the respective component sections 26-36 are provided in an app operating on a mobile terminal 2. When a user installs this app, the respective component sections 26-36 are implemented in the program storage section 9 of the system, and areas for the respective data 15, 16 are secured in the data storage section 8.

Figure 5:
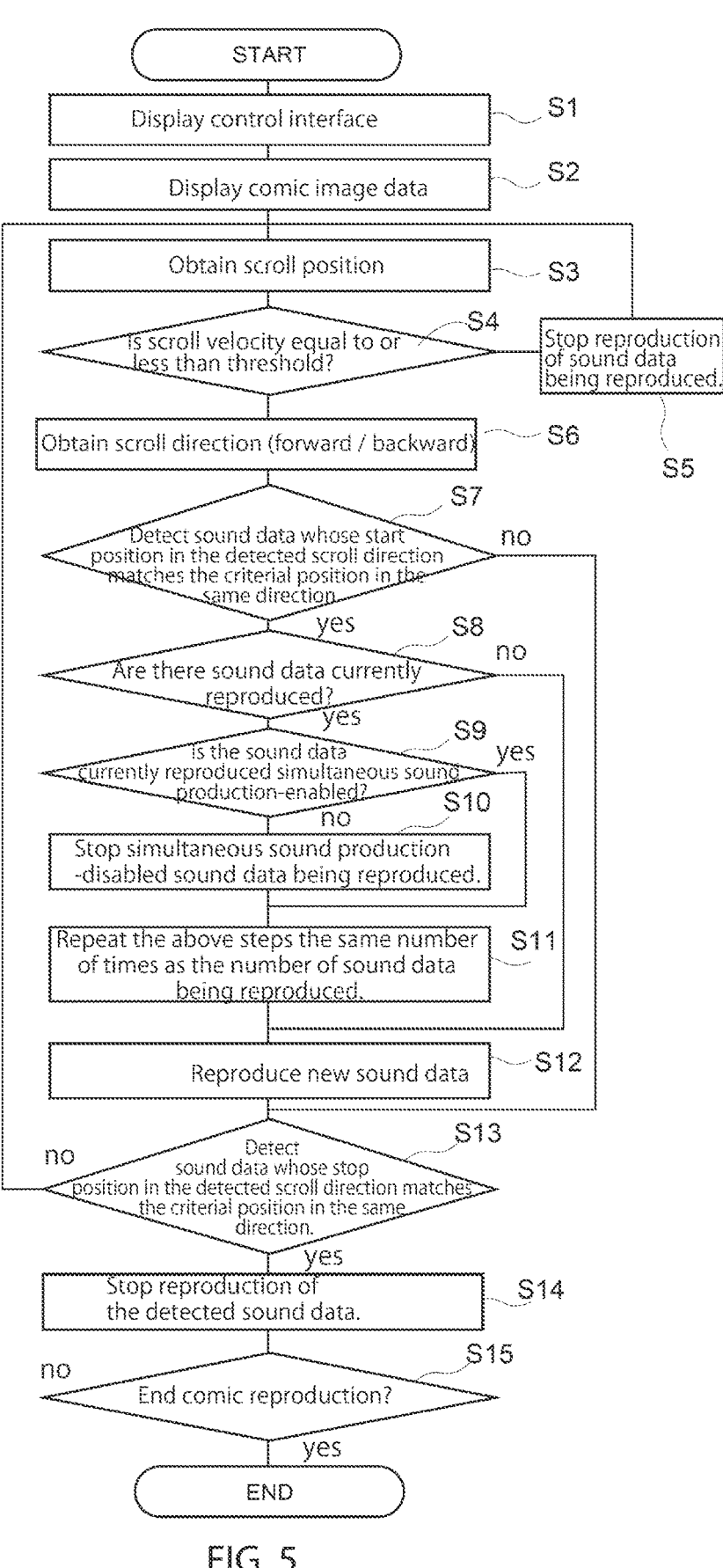
FIG. 5 is a flowchart showing the operations according to the one embodiment of the present invention.

FIG. 5 is a flowchart showing the operations of this system. Each of reference numbers S1-S12 in the figure corresponds to each of Steps S1-S12, respectively, which will be discussed below.

Control Interface

Upon launching the app, firstly, the control interface display section 27 displays a control interface on the display 10 (Step S1).

Figures 6, 7:
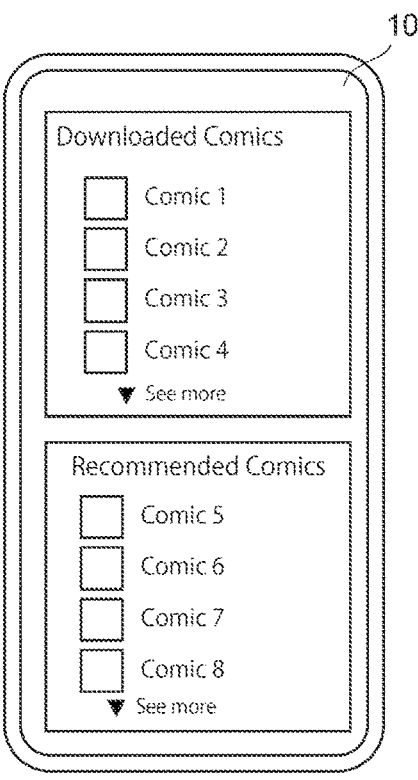
FIG. 6 is a schematic view showing a control interface of the user terminal according to the one embodiment of the present invention.
FIG. 7 is a schematic view showing the control interface of the user terminal according to the one embodiment of the present invention.

This control interface appears as shown in FIG. 6 and FIG. 7, and has an interface for referring to the comic data DB 22 and displaying a list of comic data 15 stored in this terminal 2 (FIG. 6), and a configuration interface (FIG. 7) transitioned from the interface of FIG. 6.

From the control interface as shown in FIG. 7, the screen reproduction criterial position data 23 and/or the scroll speed threshold 24 may be configured. Note that, as mentioned earlier, a method for configuring the screen reproduction criterial position data 23 and/or the scroll speed threshold 24 is not limited to the present example, and may be specified in various ways.

Also, in the control interface as shown in FIG. 7, language setting may be performed. In this example, Japanese, which is an original language of the comic data 15, is set, but when other language audio and/or text are available, other language selections may be displayed in a pull-down manner according to settings of the sound data reproduction position data 20 in the comic data 15.

Furthermore, even languages unavailable here may be configured if "Use automatic translation" button is available.

Note that the language setting method is not limited to the present example either, and may be configured in other ways.

Also, the above settings may be configured commonly applicable to all comic data, or alternatively, may be configured for each comic data, or both may be made available.

Comic Image Data Reproduction

When desired comic data is selected from this control interface, the comic image data display section 28 calls the comic image data 18 from the data storage section 8 and displays the comic image data 18 on the display 10 of this terminal 2 (Step S2).

At this time, the comic image data 18 is displayed so that the upper end of the comic image data 18 aligns with the upper end of the display 10 (see FIG. 3).

Next, as the user drags on the display 10 (touch panel 12) to start scrolling, the scroll position acquisition section 29 detects it and obtains a current scroll position (Step S3). In this embodiment example, the current scroll position is at a distance S1 from the upper end of the comic image data 18 to the upper end of the display 10 (see FIG. 3).

Scroll Speed Detection

Next, the scroll velocity detecting section 32 calculates a scroll speed and determines whether the scroll speed is equal to or less than the scroll speed threshold 24 (Step S4). Here, if the scroll speed is equal to or greater than the scroll speed threshold 24, reproduction of all currently replayed sound data (if any) is stopped (Step S5).

Such control prevents a significant mismatch between the sound data reproduction and the image due to an excessive scroll speed, and/or repeated reproduction and stopping of many audio data items in a short period of time.

Note that, as stated previously, the user may adjust this threshold according to the user's preferences.

Scroll Direction Detection and Reproduction Criterial Position Identification Next, the scroll direction detecting section 31 detects a scroll direction (Step S6). In this embodiment example, the scroll direction detecting section 31 detects a forward direction when the user is scrolling the comic image data 18 downwards, whereas it detects a backward direction when the user is scrolling the comic upwards.

Since it is expected that such scroll direction switching occurs frequently, the purpose of this detection is to adjust the audio reproduction criterial position according to the longitudinal dimension of the display 10.

In other words, firstly in Step S7, the reproduction position determination section 33 identifies a sound production criterial position along the scroll direction. In this embodiment, as discussed above, in the case of forward direction, the position is at 30% (of a display height) down from the upper end of the display 10, that is, a position obtained by adding S2, which is derived from a number of pixels equivalent to 30% of the display 10 height, to the current scroll position S1 (S1+S2). Also, in the case of backward direction, the sound production criterial position will be at 70% [from the display upper end] (S1+S3).

Accordingly, in this embodiment, the reproduction criterial position will be switched depending on the scroll direction.

Note that these reproduction criterial positions is adapted so that the user may configure these positions by moving them up and down via the control interface (FIG. 7).

Audio Data Reproduction

Next, the reproduction position determination section 33 determines whether there is sound data with a reproduction start position matching the reproduction criterial position.

For example, in the case of forward scrolling in FIG. 3, the first instance that reproduction start position transverses the sound production criterial position is the sound effect 1. In other words, in Step S7, when a state where S1+S2=M3 is detected, the sound effect 1 is identified, and processing of Step S8 and later are started for this sound effect 1.

Firstly, in Step S8, it is determined whether there is other sound data currently being reproduced. Here, if the sound effect 1 is the first to be reproduced, it means there is no other sound data currently being reproduced.

Whereas, if the start position of the line 1 traverses the reproduction position (S1+S2=M1) after the reproduction of the sound effect 1 started, since the sound effect 1 is already in the process of reproduction, it means there is other sound being reproduced.

In this case, the flow proceeds to Step S9, where it is determined whether or not the concurrently being reproduced sound data is simultaneous reproduction-enabled based on the simultaneous reproduction-disabled flag. As previously discussed, the sound effect 1 is simultaneous reproduction-enabled sound data (the simultaneous reproduction-disabled flag is off), and therefore, this sound effect 1 skips Step S10 and proceeds to Steps S11, S12, where the sound of the line 1 will be generated while the sound effect 1 continues to be reproduced (Step S12).

Note that if the reproduction start position of the line 2 traverses the criterial position (S1+S2=M5) during the line 1 reproduction, the production of the line 1 sound will be stopped in Step 10 because the line 2 is simultaneous reproduction-disabled, and thereafter, the sound of the line 2 will be reproduced in Step S12.

Stopping Audio Data Reproduction

Next, in Step S13 and later, detection of the reproduction stop position is performed. Specifically, a sound file at its end position, traversing the reproduction criterial position is detected. In the FIG. 3 example, this detection occurs when the stop position M4 of the sound effect 1 reaches the reproduction criterial position (S1+S2).

In this case, since the sound effect 1 is a simultaneous reproduction-enabled sound, it continues to be reproduced regardless of the reproduction of the line 1, line 2, and moreover, since its loop reproduction-disabled flag is off, the sound effect 1 is reproduced repeatedly, but its reproduction stops when its end position reaches the criterial position (Step S14).

Thereafter, the above steps will be repeated until the comic reproduction ends (Step S15).

Switching Scroll Direction

Note that in some cases forward scrolling is switched to backward scrolling, and in those cases, the scroll direction detecting section 31 detects that in the above Step S6, upon which the criterial positions employed will be switched to the values for the opposite direction (S1+S3 (70% of the display)), and the reproduction start position and/or the reproduction stop position employed will be also the values for the backward scroll direction to execute Step S7 and later.

In backward scrolling, attempting to use the same starting position as in the forward scrolling would result in line sounds reproduced after the corresponding line display ended, and/or timing of the sound effect reproduction becoming misaligned, but using different criterial positions enables synchronization of the sound reproduction with the display.

Language Processing

Lastly, language processing by the language processing section will be discussed.

In this embodiment, when there are two or more languages available for the comic data, the comic image data 18 and the sound data 19 are reproduced in a user-selected language based on the languages configured in the control interface (FIG. 7).

Note that when the user specifies a language other than the ones available for the comic data 15, and also when "Automatically translate" is On, the language processing section 36 is adapted to perform automatic translation as well as audio synthesis based on text stored in the sound data reproduction position data.

Since this automatic translation may be performed by utilizing a translation API provided from an external site, descriptions for the automatic translation will be omitted here.

Also, with regard to displaying different languages, when comic image data corresponding to a particular language is provided, comic image data 18 for that language will be used in place of the comic image data 18 in its original language. Otherwise, text of that language may be displayed as a caption by overlaying the text on the original language.

Other Embodiments

Figure 8:
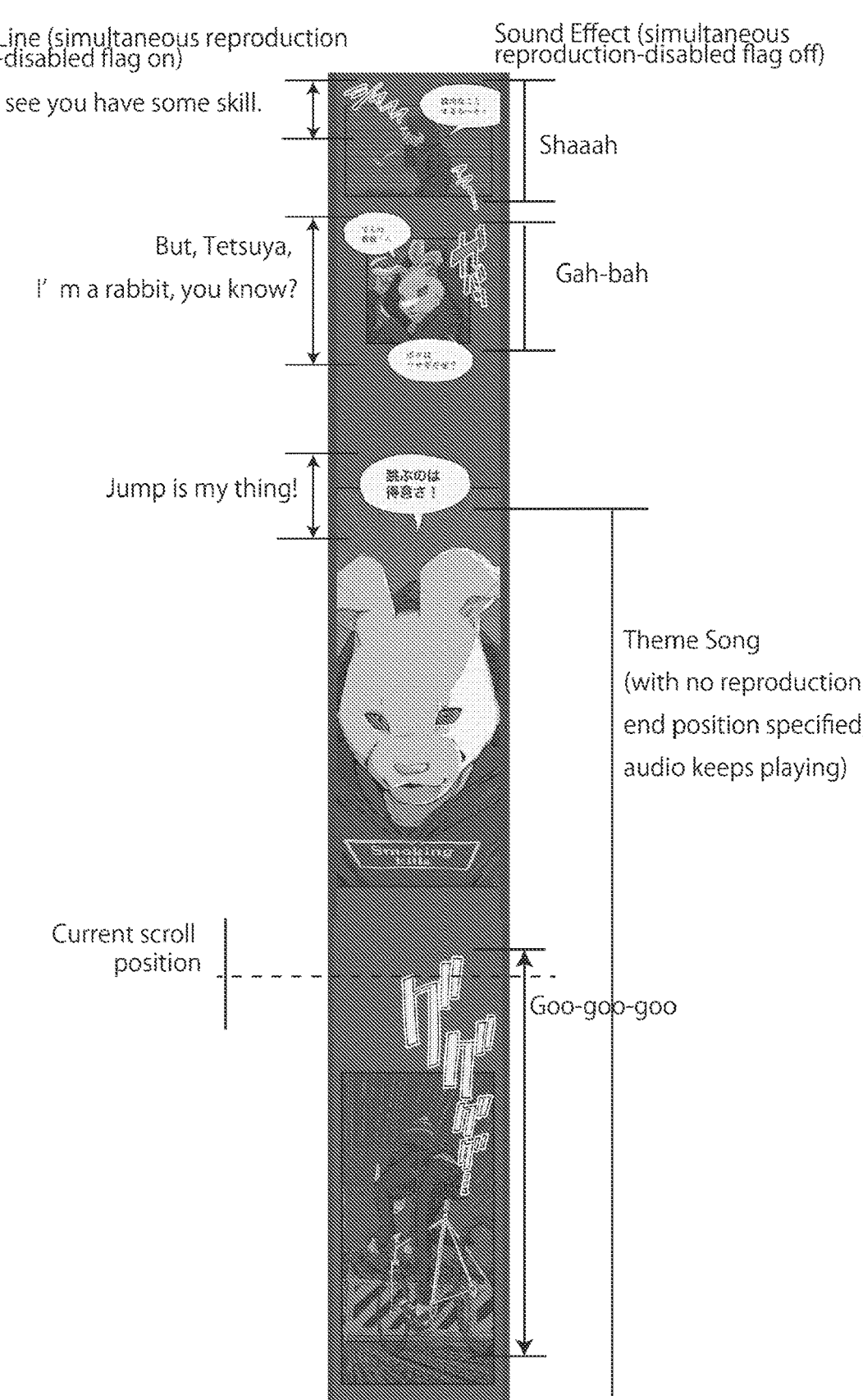
FIG. 8 is a schematic view showing another embodiment example according to the one embodiment of the present invention.

FIG. 8 is a conceptual diagram showing another example of synchronizing the comic image data and the sound data. In this example, a theme song is included as data with the simultaneous reproduction-disabled flag turned off, wherein the loop reproduction-disabled flag of this theme song is off, and there is no reproduction stop position specified. Therefore, once reproduced, this theme song will play endlessly until this comic data is closed.

Figure 9:
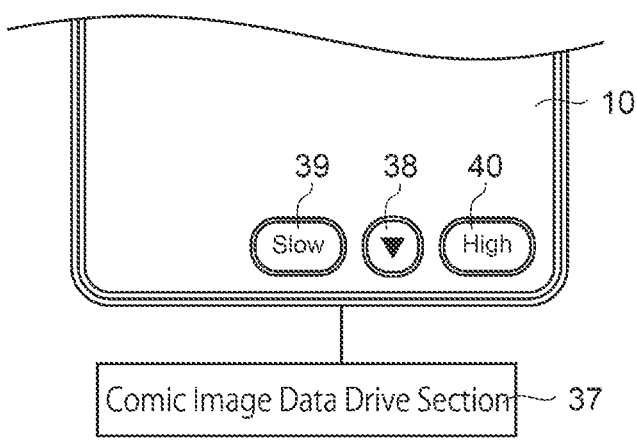
FIG. 9 is a schematic view showing yet another embodiment example according to the one embodiment of the present invention.
Figure 10:
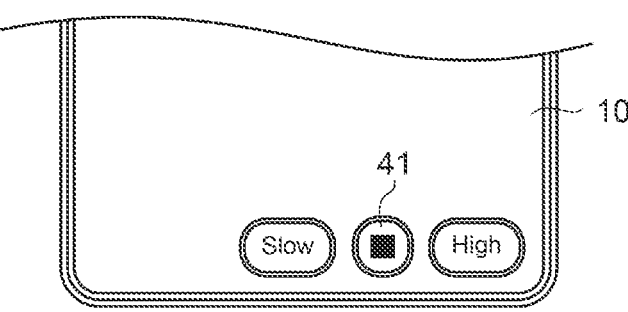
FIG. 10 is a schematic view showing still another embodiment example according to the one embodiment of the present invention.

Also, FIG. 9 and FIG. 10 are examples of implementing automatic scroll functionality.

In this example, indicated with 37 in the figure, a comic image data drive section is provided in the program storage section 2 (FIG. 2), whereas an automatic scroll start button 38, a slow button 39, and a fast button 40 are implemented at the lower end part of the display 10 of the smartphone.

When the automatic scroll start button 38 is pressed by the user, the comic image data drive section 37 drives comic data on the display 10 downwards at a scroll velocity for normal readers. Also, when the slow button 39 is pressed, the comic image data drive section 37 drives comic image data at 70% of the normal scroll velocity; whereas if the fast button 40 is pressed, it drives comic image data at 130% of the normal scroll velocity.

In this example, even while driving comic image data at each velocity, the comic image data drive section 37 is configured to allow the user to stop the scroll motion temporarily and/or scroll in a desired direction if the user uses a finger to touch and drag on the display 10. Also, when the user lets the finger off the display 10, the comic image data drive section 37 resumes driving the comic image data at the original velocity.

Note that the user may stop the automatic drive of comic data by pressing a stop button indicated with 41 in FIG. 10.

According to such a configuration, it is no longer necessary to keep scrolling with a finger to thereby simplify the operation.

It is noted that the comic image data drive section 37 preferably stores a normal scroll velocity of a reader, who operates this smartphone, and determines the drive velocity of the comic image data based on that normal scroll velocity. Also, the drive velocity may be determined by the comic distribution server 1 (FIG. 1) with artificial intelligence by taking other readers' data into account, and provided to each user terminal. The above slow and fast scrolling are also preferably determined in similar manners.

Although one embodiment of the present invention has been described, it should be understood that the present invention is not be limited to the above embodiment, and various changes and modifications may be made without departing from the scope and spirit of the invention.

For example, in the above embodiment, the configuration of the present invention was implemented in the user terminal 2, but the present invention is not be limited to that, and may have a configuration implemented in the server 1 side so that the user terminal 2 uses a browser to only view the processing result of the server 1. Also, in this case, all of the configuration does not need to be only in the server or only in the user terminal, and parts of the configuration may be provided in either of them to enable the configuration of the present invention through collaboration.

Furthermore, the user terminal is not limited to a mobile terminal, but may be a PC or other computers.

Also, the reproduction of the comic image data is not limited to a scheme of downloading and reproducing the comic image data on the user terminal, but may be done by reproduction via streaming from the server.

Moreover, the above embodiment example was in a configuration accommodating the vertical scroll comics, but the scroll direction is not limited to a vertical direction, and may be a horizontal direction. Further, scrolling may be in both vertical and horizontal directions.

DESCRIPTION OF THE REFERENCE NUMBERS

1. Comic distribution server
2. User terminal
3. Internet
4. CPU 5. RAM
6. Input/output section
7. Bus
8. Data storage section
9. Program storage section
10. Display
11. Speaker
12. Touch panel
13. Communication interface
15. Comic data
16. Sound data reproduction configuration data
18. Comic image data
19. Sound data
20. Sound data reproduction position data
22. Comic data DB
23. Screen reproduction criterial position data
24. Scroll speed threshold
26. Operating system
27. Control interface display section
28. Comic image data display section
29. Scroll position acquisition section
30. Sound data reproduction control section
31. Scroll direction detecting section
32. Scroll velocity detecting section
33. Reproduction position determination section
34. Sound data reproduction section
35. Sound data stop section
36. Language processing section
37. Comic image data drive section
38. Automatic scroll start button
40. Fast button
41. Stop button

The invention claimed is:

1. A comic reproduction system with scroll direction based sound reproduction control, using
   comic data including:
      comic image data including backgrounds, characters, and speech balloons, which are prepared for a story to progress in a predetermined scroll direction;
      sound data including lines, mimetic words, onomatopoeia, phonomimes, phenomimes, a title, sound effects, and music, which correspond to the comic image data; and
      sound data reproduction position data for storing a reproduction start position of the sound data as a position along the scroll direction of the comic image data,
   the comic reproduction system comprising:
   a comic image data display module including a processor and a memory, the module being configured to display a predetermined part of the comic image data on a display screen of a device, and to continuously move the displayed part of the comic image data on the display screen in accordance with a user's scroll operation;
   a scroll direction detecting module including a processor and a memory, the module being configured to detect whether the scrolling direction of a user's scrolling operation is a forward scrolling direction or a reverse scrolling direction; and
   a sound data reproduction module including a processor and a memory, the module being configured to determine, according to the detection of the scrolling direction by the scroll direction detecting module, whether a reproduction start position of the sound data reached a predetermined reproduction criterial position within the display screen during the movement of the displayed part of the comic data by the comic image data display module, and reproduce the sound data,
   wherein for the reproduction criterial position, different reproduction criterial positions are set within the display screen for forward scrolling and reverse scrolling, such that the reproduction criterial positions are defined based on a distance from an edge of the display screen or a percentage of a screen dimension, respectively.

2. The comic reproduction system of claim 1, wherein different positions may be configured for the reproduction start position in forward scroll direction and the reproduction start position in backward scroll direction, respectively.

3. The comic reproduction system of claim 1, wherein the sound data reproduction position data may configure, for specific sound data, a reproduction stop position in addition to the reproduction start position.

4. The comic reproduction system of claim 1, wherein the sound data reproduction position data stores, for each sound data, whether the sound data is simultaneous reproduction-enabled or simultaneous reproduction-disabled, and
   when the sound data reproduction module detects that a reproduction start position of specific sound data reached a predetermined reproduction criterial position, the sound data reproduction module stops reproduction of other sound data being reproduced and reproduces the specific sound data if the specific sound data is simultaneous reproduction-disabled and other sound data being reproduced is simultaneous reproduction-disabled.

5. The comic reproduction system of claim 1, wherein the sound data reproduction module stops reproduction of sound data if a scroll velocity by the user's scroll operation reaches a value equal to or greater than a threshold.

6. The comic reproduction system of claim 5, further comprising
   a control interface display module including a processor and a memory to provide a configuration interface for configuring the threshold of the scroll velocity.

7. The comic reproduction system of claim 1, wherein the sound data further includes text data of the sound data, the comic reproduction system, further comprising
   a language processing module including a processor and a memory, being configured to perform display on the display screen of the device according to the user's language.

8. The comic reproduction system of claim 1, further comprising
   a language processing module including a processor and a memory, being configured to execute automatic translation based on the sound data and display the automatically translated text on the screen.

9. The comic reproduction system of claim 8, wherein the language processing module including a processor and a memory, further generates sound data based on the automatically translated text.

10. The comic reproduction system of claim 1, wherein further, a reproduction start position of sound data corresponding to a speech balloon displayed in a comic is automatically generated according to a position of the speech balloon.

11. The comic reproduction system of claim 1, wherein the reproduction criterial position in the forward scrolling direction is located at a position nearer to a trailing edge of the display screen along the forward scrolling direction, and the reproduction criterial position in the reverse scrolling direction is located at a position nearer to the trailing edge of the display screen along the reverse scrolling direction.

12. A comic reproduction method utilizing a computer, using comic data including:

comic image data including backgrounds, characters, and speech balloons, which are prepared for a story to progress in a predetermined scroll direction;

sound data including lines, mimetic words, onomatopoeia, phonomimes, phenomimes, a title, sound effects, and music, which correspond to the comic image data; and sound data reproduction position data for storing a reproduction start position of the sound data as a position along the scroll direction of the comic image data, the comic reproduction method comprising the steps of:

displaying comic image data by a computer, by displaying a predetermined part of the comic image data on a display screen of a device, and also continuously moving the displayed part of the comic image data on the display screen with a scroll operation by a user;

detecting whether the scrolling direction of a user's scrolling operation is a forward scrolling direction or a reverse scrolling direction; and reproducing sound data by the computer, by determining, according to the detection of the scrolling direction by the scroll direction detecting module, whether a reproduction start position of the sound data reached a predetermined reproduction criterial position within the display screen during the movement of the displayed part of the comic data by the step of displaying comic image data, and reproducing the sound data wherein for the reproduction criterial position, different reproduction criterial positions are set within the display screen for forward scrolling and reverse scrolling, such that the reproduction criterial position in the forward scrolling direction is located nearer to a trailing edge of the display screen along the forward scrolling direction, and the reproduction criterial position in the reverse scrolling direction is located nearer to the trailing edge of the display screen along the reverse scrolling direction.

13. A non-transitory computer-readable medium storing computer instructions for reproducing comic data, using comic data including:

comic image data including backgrounds, characters, and speech balloons, which are prepared for a story to progress in a predetermined scroll direction;

sound data including lines, mimetic words, onomatopoeia, phonomimes, phenomimes, a title, sound effects, and music, which correspond to the comic image data; and sound data reproduction position data for storing a reproduction start position of the sound data as a position along the scroll direction of the comic image data, the instructions, when executed by a computer, cause the computer to perform the steps of:

displaying comic image data by the computer, by displaying a predetermined part of the comic image data on a display screen of a device, and also continuously moving the displayed part of the comic image data on the display screen with a scroll operation by a user;

detecting whether the scrolling direction of a user's scrolling operation is a forward scrolling direction or a reverse scrolling direction; and reproducing sound data by the computer, by determining, according to the detection of the scrolling direction by the scroll direction detecting module, whether a reproduction start position of the sound data reached a predetermined reproduction criterial position within the display screen during the movement of the displayed part of the comic data by the step of displaying comic image data, and reproducing the sound data, wherein for the reproduction criterial position, different reproduction criterial positions are set within the display screen for forward scrolling and reverse scrolling, such that the reproduction criterial position in the forward scrolling direction is located nearer to a trailing edge of the display screen along the forward scrolling direction, and the reproduction criterial position in the reverse scrolling direction is located nearer to the trailing edge of the display screen along the reverse scrolling direction.

\*    \*    \*    \*    \*